United States Patent [19]

Suzuki et al.

[11] Patent Number: 4,607,138

[45] Date of Patent: Aug. 19, 1986

[54] METHOD OF CONTROLLING A PRINTING APPARATUS

[75] Inventors: Masamitu Suzuki; Yoshito Hagiwara, both of Hadano, Japan

[73] Assignee: Hitachi, Ltd., Tokyo, Japan

[21] Appl. No.: 686,658

[22] Filed: Dec. 27, 1984

[30] Foreign Application Priority Data

Dec. 28, 1983 [JP]  Japan ................................ 58-245491

[51] Int. Cl.$^4$ .......................... G09G 1/18; G06F 3/14
[52] U.S. Cl. ...................................... 178/30; 340/800
[58] Field of Search ...................... 178/30, 4, 25, 26 R; 340/800, 798; 400/62, 63, 76

[56] References Cited

U.S. PATENT DOCUMENTS 4,125,829  11/1978  Kayashima ........................ 178/30 X Primary Examiner—Stafford D. Schreyer
Attorney, Agent, or Firm—Antonelli, Terry & Wands

[57] ABSTRACT

In a printing apparatus such as a laser beam printer, the time required for decomposing format data into dots is compared with the printout time for a page. If the former is not longer than the latter, both format data and description (e.g. character) data are decomposed into dots in the same one of a couple of memories and said couple of memories are alternately and cylically brought to store operation and printout operation. If, on the contrary, the former is longer than the latter, the decomposed format is fixed in one memory while description data is decomposed every time in the other memory, and the contents of both memories are superimposed when printed out.

3 Claims, 5 Drawing Figures

METHOD OF CONTROLLING A PRINTING APPARATUS

BACKGROUND OF THE INVENTION

This invention relates to the control of a printing apparatus of the type in which image information is decomposed into a set of dots (or a dot pattern) in a image memory before printout, such as a laser beam printer, and more specifically to the control of the decomposition of image information in memories and printout therefrom.

A prior art printing apparatus disclosed in U.S. Pat. No. 4,125,829 decomposes character information and format information separately into respective dot patterns which are stored in respective memories and are superimposed at the time of printout. This apparatus operates in the scan line by scan line fashion, that is, it decomposes image information for a scan line and prints it out, then for the next scan line, and so on.

As a prior improvement aiming at speedup, there has been an printing apparatus which is equipped with a couple of memories each of which accommodates dot patterns for a complete page so that dot patterns for a page are read out from one of the memories to be supplied to a printer while dot patterns for the next page are being developed in the other memory. As is often the case, an image to be printed consists of a portion for a format and a portion for characters, diagrams and the like to fill in the format, the latter portion carrying the significant part of information. It is also usual that a format is kept intact over a plurality of pages. Nevertheless it is conventional to decompose a format into dots anew for every page. As a result, when a complicated format is used, the decomposition of format portion fails to catch up with printout, and in spite of the installation of the above-mentioned couple of memories the waiting time of a printer becomes long, resulting in a delay in printing.

SUMMARY OF THE INVENTION

It is an object of this invention to improve the speed of a printing apparatus of the type in which image information is decomposed into dots before printout.

It is another object of this invention to improve the speed of a printing apparatus of the above-mentioned type when a fixed portion of image information such as a format is complicated, and that common to many successive pages.

It is a further object of this invention to optimize according to the complexity of a format the manner of operation of a printing apparatus which comprises means for decomposing a fixed portion of image information such as a format and the remaining portion separately into dots and a couple of memories for storing dot patterns.

In accordance with this invention, in a printing apparatus which comprises means for decomposing a fixed portion of image information such as a format and the remaining portion separately into dots and a couple of memories for storing dot patterns, the time required for decomposing said fixed portion is compared with the printout time for an entire page. If the former is not longer than the latter, both said fixed portion and the remaining portion are decomposed in the same one of said couple of memories, and said couple of memories are brought to store operation and printout operation alternately and cyclically. On the contrary, if the former is longer than the latter, the dot pattern of said fixed portion are fixedly held in one of the memories while the remaining portion is decomposed every time in the other memory, and the outputs from both memories are superimposed at the time of printout.

The above and other objects, features and advantages of this invention will be readily understood from the following description of a preferred embodiment with reference to the accompanying drawings.

DESCRIPTION OF THE PREFERRED EIBODIMENT

Figure 1:
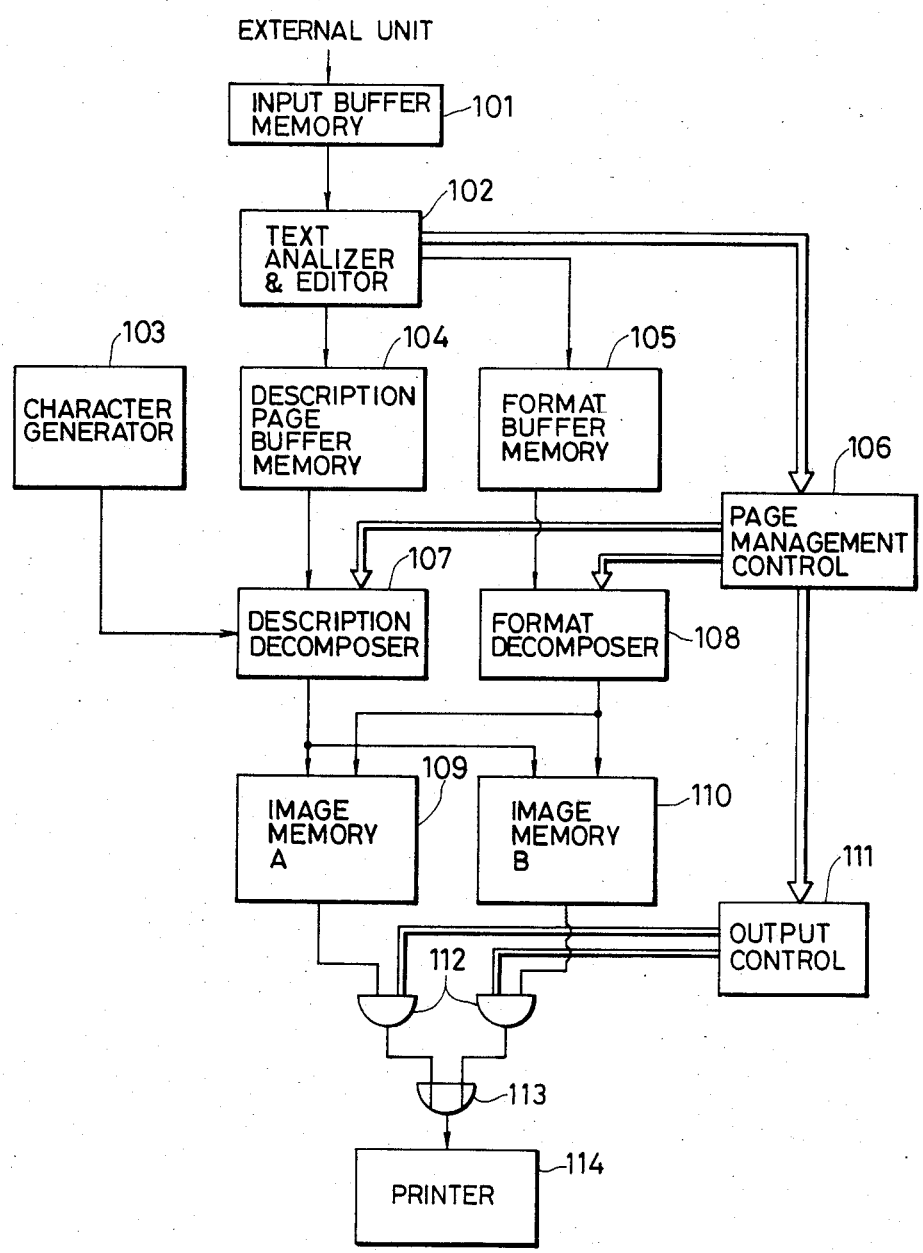
FIG. 1 is a block diagram showing an example of the print controller of a laser beam printer to be controlled according to this invention.

FIG. 1 schematically shows an example of the print controller of a laser beam printer to which the present invention is to be applied. Information to be printed other than format information, such as character, diagram, graph and the like information, varies from page to page, and will be referred to generically as "description" information hereinafter.

Print information input for a page from an external unit (not shown) including format data, character codes, diagram data, print control codes and the like is temporarily stored in an input buffer memory 101, and is subsequently analyzed and edited by a text analyzer and editor 102. As a result of the above analysis, if there is a character code, for example, the address in a character generator 103 at which a dot pattern representing the shape of the corresponding character is held is stored at the corresponding location in a description page buffer memory 104, and if there is a print control code, the information represented by it such as character size, character space value, etc. is stored at an appropriate location in the description page buffer memory 104. On the other hand, if there is format data, it is stored in a format buffer memory 105. The text analyzer and editor 102 also informs a page management control 106 whether the contents of the format buffer memory 105 is used or not in decomposing the contents of the description page buffer memory 104.

Figure 2:
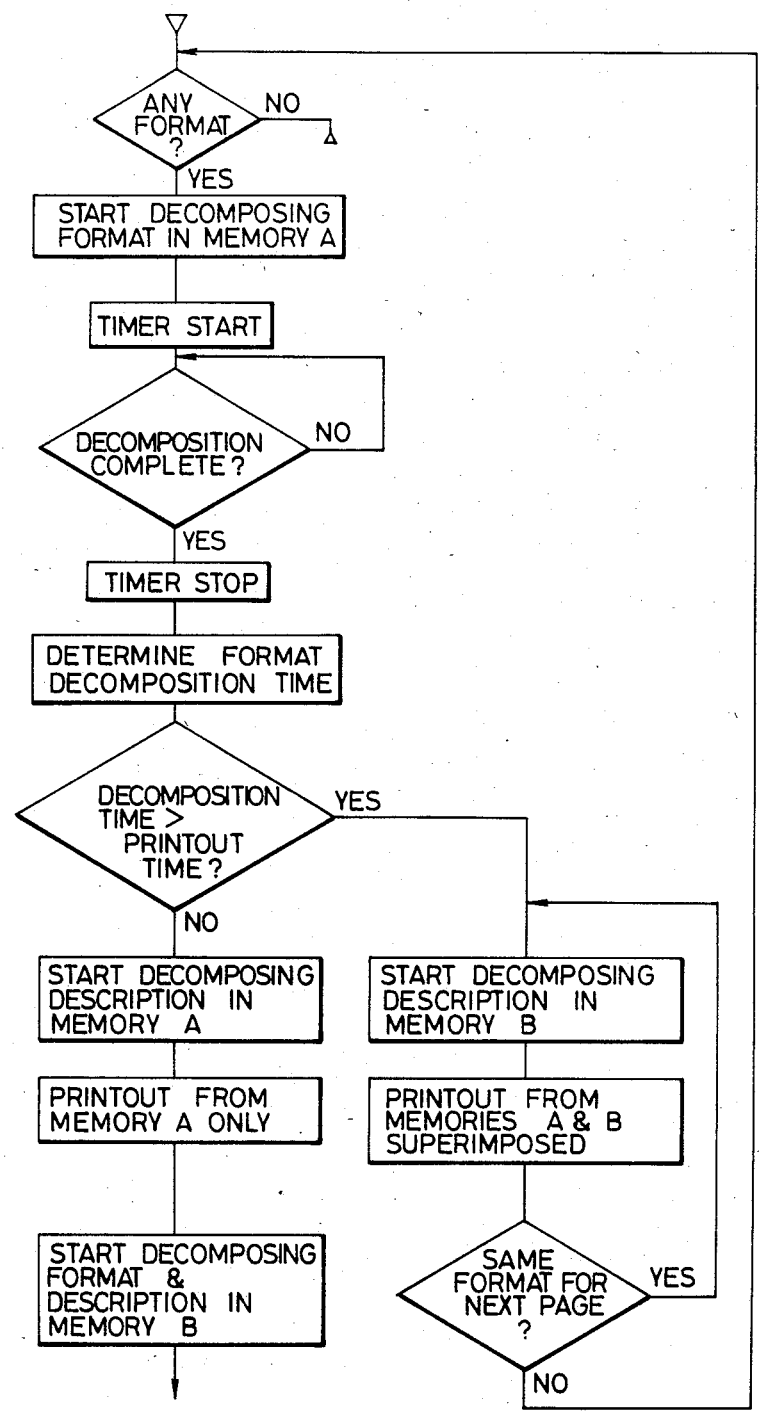
FIG. 2 is a flow chart illustrating an control sequence according to this invention for the print controller shown in FIG. 1.

Subsequently the process shown in the flow chart of FIG. 2 proceeds under the direction of the page management control 106. First, the page management control 106 investigates whether a format is used in the page now to be decomposed. If a format is used, it selects either an image memory A 109 or an image memory B 110 which is idle at the time, and indicates the address of the selected image memory to a format decomposer 108. It is assumed that the image memory A 109 has been selected. Receiving the above indication, the format decomposer 108 decomposes the format data held in the format buffer memory 105 into dots in the selected image memory (assumed to be A). Meanwhile, the page management control 106 measures the time spent in decomposing the format data into dots by means of a timer, and compares it with the printout time for a page which is a predetermined value depending on sheet size only for a laser beam printer or the like.

When the time spent in decomposing the format data is longer than the printout time, the page management control 106 directs a description decomposer 107 to decompose the contents of the description page buffer memory 104 into dots in the other image memory (B in this instance). On completion of the above decomposition the page management control 106 gives a direction to an output control 111, which makes a pair of gates 112 ON so that both outputs from the image memory A (format) and the image memory B (description) are taken out simultaneously to be superimposed and supplied, via an OR gate 113, to an printer 114.

Then the page management control 106 investigates whether the same format is to be used in the next page or not. Such information can be obtained from the text analyzer and editor 102 which has then finished the analyze and edit operation for the next page. If the same format is to be used, the contents of that image memory which was selected first (memory A in this instance) are kept intact, and the description decomposer 107 is directed to decompose description data for the next page in the other image memory (B in this instance). If, on the contrary, a different format is to be used in the next page, the page management control 106 directs the format decomposer 108 to start decomposing format data newly for the next page, and subsequently the steps described above are repeated.

On the other hand, when the time spent in decomposing the format data is not longer than the printout time, the description decomposer 107 is directed to decompose the contents of the description page buffer memory 104 into dots in that image memory which has been selected before (memory A in this instance). When the above decomposition is finished the complete image of a page which is a combination of format and description has been formed in said image memory (A in this instance). The page menagement control 106 then directs the output control 111 to make that one of the gates 112 which is connected to said image memory (A in this instance) ON, the output being supplied therefrom, via the OR gate 113, to the printer 114. During this printout operation the page management control 106 directs the format decomposer 108 to decompose format data for the next page in the other image memory (B in this instance), and subsequently the steps described above are repeated.

Figure 3:
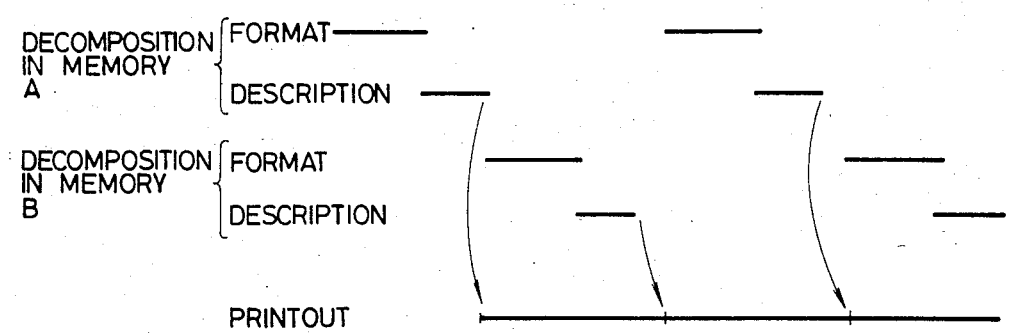
FIG. 3 through FIG. 5 are time charts showing examples of the time relation of decompose operations and printout operations.
Figure 4:
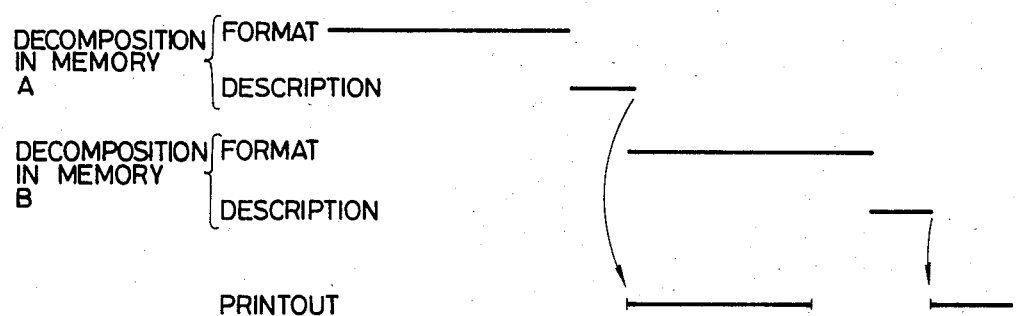
Figure 5:
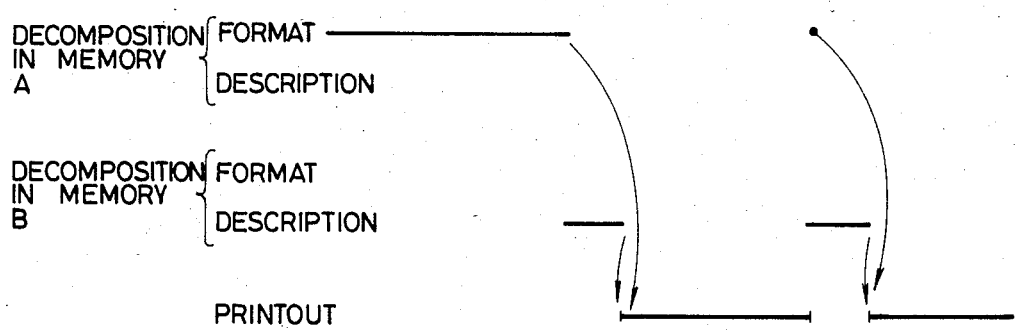

FIG. 3 through FIG. 5 are time charts for decompose operations in the image memories A and B as well as printout operations. As is shown in FIG. 3, when the format decomposition time is not longer than the printout time, both format and description are decomposed in the same image memory, and the contents of one of the image memories are printed out while the decomposition for the next page is being carried out in the other image memory, which repeats with the image memories A and B alternating with each other.

In the case where the format decomposition time is longer than the printout time, if the same mode of operation as above were maintained, as is shown in FIG. 4, the wait and halt period of the printer would increase infinitely as the format decomposition time increases. However, according to the present invention, in that case, as long as the same format is in use, the decomposed format is preserved in one of the couple of image memories and only the decomposed description in the other image memory is renewed. Therefore the wait and halt period of the printer never exceeds the time required for decomposing description data for a page into dots.

Alghough the above description has made an issue of the decomposition time for a format, the present invention is not limited to the handling of a format, but is equally applicable to the handling of any other fixed image portion which does not vary over a plurality of pages. The page management control function necessary for the control operations described above is easily implemented by programming a conventional microprocessor, and it is also very easy for those skilled in the art to construct special hardware for it. Other individual operations such as text analyzing and editing, decomposing into dots, etc. are substantially the same as conventional ones, and their details are omitted.

We claim:

1. A method of controlling a printing apparatus equipped with means for decomposing into dots separately a first image portion of image information for a page unaltered over pages and a second image portion alterable from page to page as well as a plurality of memories each capable of storing dot patterns for a complete page to be printed out, comprising the steps of:

comparing the time required for decomposing said first image portion into dots with the printout time for a page; and selecting, according as the time required for decomposing said first image portion is longer than the printout time for a page or not, a first operating mode in which the dot pattern of said first image portion is fixedly kept in one of said plurality of memories while said second image portion is decomposed in another one of said plurality of memories and the outputs from the two memories are superimposed for printout, or a second operating mode in which both said first and second image portions are decomposed in the same one of said plurality of memories while said plurality of memories are by turns brought to cyclic store operation followed by printout operation.

2. A method of controlling an printing apparatus as claimed in claim 1 wherein said comparing step includes the steps of starting the decomposition of said first image portion, and measuring the time spent in decomposing said first image portion.

3. A method of controlling an printing apparatus as claimed in claim 1 wherein said first image portion corresponds to a format.

* * * * *